United States Patent [19]
Goldberger

[11] Patent Number: 5,246,638
[45] Date of Patent: Sep. 21, 1993

[54] PROCESS AND APPARATUS FOR ELECTROCONSOLIDATION

[75] Inventor: William M. Goldberger, Columbus, Ohio

[73] Assignee: Superior Graphite Co., Chicago, Ill.

[21] Appl. No.: 841,584

[22] Filed: Feb. 24, 1992

Related U.S. Application Data

[63] Continuation-in-part of Ser. No. 544,046, Dec. 14, 1990, and a continuation-in-part of Ser. No. 286,980, Dec. 20, 1988, abandoned.

[51] Int. Cl.⁵ .................. B29C 43/02; B29C 67/00
[52] U.S. Cl. .................................. 264/27; 264/56; 264/109; 264/320; 419/49; 419/52; 425/78; 425/174.6; 425/406
[58] Field of Search .................. 264/27, 56, 109, 320; 419/23, 49, 52; 425/77, 78, 406, 174.6

[56]  References Cited

U.S. PATENT DOCUMENTS

| | | | |
|---|---|---|---|
| 4,041,123 | 8/1977 | Lange et al. | 264/332 |
| 4,539,175 | 9/1985 | Lichti et al. | 428/404 |
| 4,547,430 | 10/1985 | Goldberger et al. | 419/49 |
| 4,640,711 | 2/1987 | Lichti et al. | 264/65 |
| 4,853,178 | 8/1989 | Oslin | 419/23 |
| 4,933,140 | 6/1990 | Oslin | 419/23 |

OTHER PUBLICATIONS

Graphitic Gran, 5500 Grade, Pictures (100X, 200X).
Desuko Graphitic Carbon, 9001 Grade, Pictures (50X, 50X).
Desulco No Silicon Carbide Picture.
Picture Spherical Graphitic Carbon, 9400 Grade (20KU×100 U 002 01058 GLI).
Picture HSC-9400 (15 Silicon Carbide Coating) (20KV×500 100U 006 0158 GLI).
Lange, F. F. and Terwilliger, G. R. "The Powder Vehicle Hot-Pressing Technique" *Am. Cev. Soc. Bull.*, vol. 52, No. 7, Jul. 1973 pp. 563-565.
Furguson, B.; Kuhn, A.; Smith, O. D.; and Hofstatter, F., "Hot Consolidation of Porous Preforms Using Soft Tooling", *Int. Journ. of Powder Met. and Powder Tech.*, vol. 20, No. 2, 1984, pp. 131-139.
Goldberger, W.; Reed, A.; and Morse, R, "Synthesis and Characterization of HSC Silicon Carbide", Ceramic Transactions, vol. 2, 1989.
Bacha, J.; Newman, J.; and White, J. "Petroleum-Derived Carbons", ACS Symposium Series 303, pp. 200-213, 1986.
Sales Bulletin on Special Graphitic Carbons; Superior Graphite.
Product Data Sheet "Spherical Graphitic Carbon 9400 Series", 1987.
Product Data Sheet "Crystalline Flake Graphite Oxidation Resistant 2900-RG Series".
Product Data Sheet "Synthetic Graphite High Purity 5500 Series", 1987.
Product Data Sheet "Silicon Carbide HSC 500", 1988.
Desulco Specifications 9001-9005 and 9012-9018.
Picture HSC 9400 (15) (100x).

*Primary Examiner*—Mary Lynn Theisen
*Attorney, Agent, or Firm*—Allegretti & Witcoff, Ltd.

[57]  ABSTRACT

The present invention is directed generally to apparatus for and improvements in powdered metal consolidation processes, some of which referred to as "electroconsolidation" processes, and more particularly to processes employing specially shaped rams or electrodes and/or other press elements for imparting uniformity of electrical flux and/or pressure to a workpiece.

Some embodiments of the improved process of the present invention contemplate controlling the degree of compaction by providing rams which generally conform to the shape of the preform. Such projections may be provided on the rams to selectively develop at least one zone of relatively high compaction within the die chamber, which results in certain embodiments associated with the electroconsolidation process in release of the major portion of the electrical energy within the zone having a relatively high degree of compaction. Moreover, at least one member of a selected shape may be inserted within the die chamber for modifying the electrical resistivity pattern thereof.

16 Claims, 7 Drawing Sheets

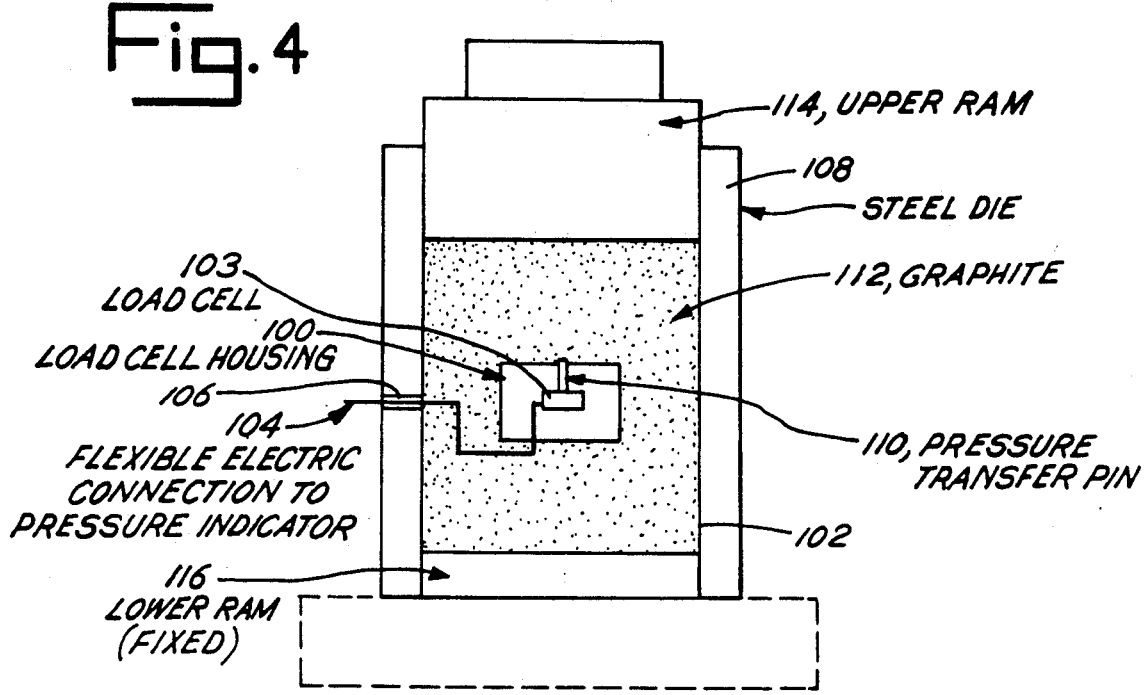
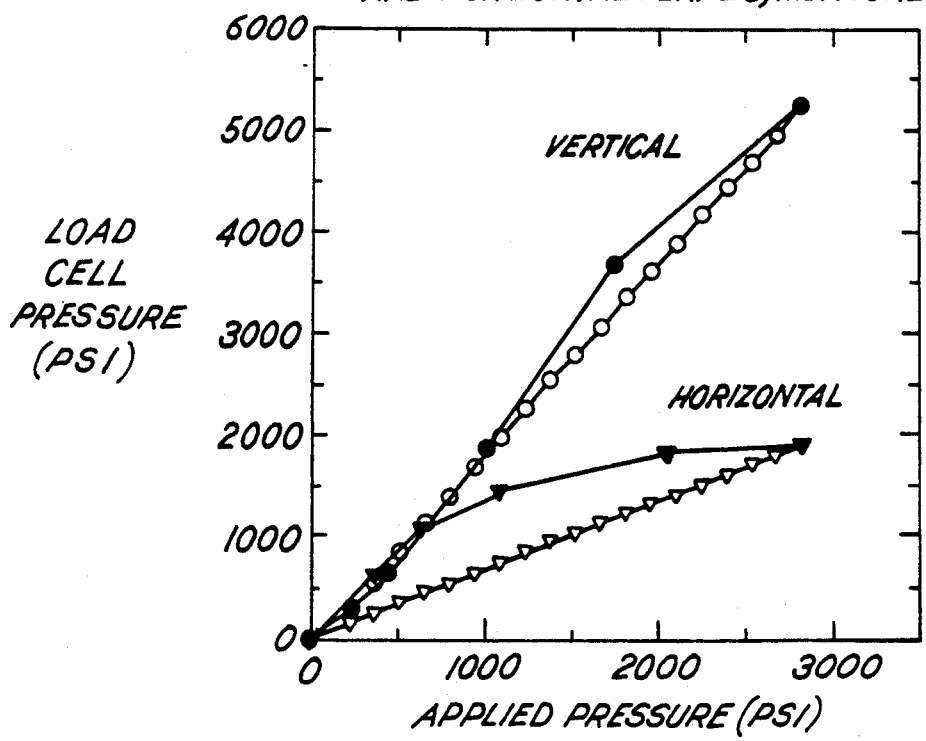

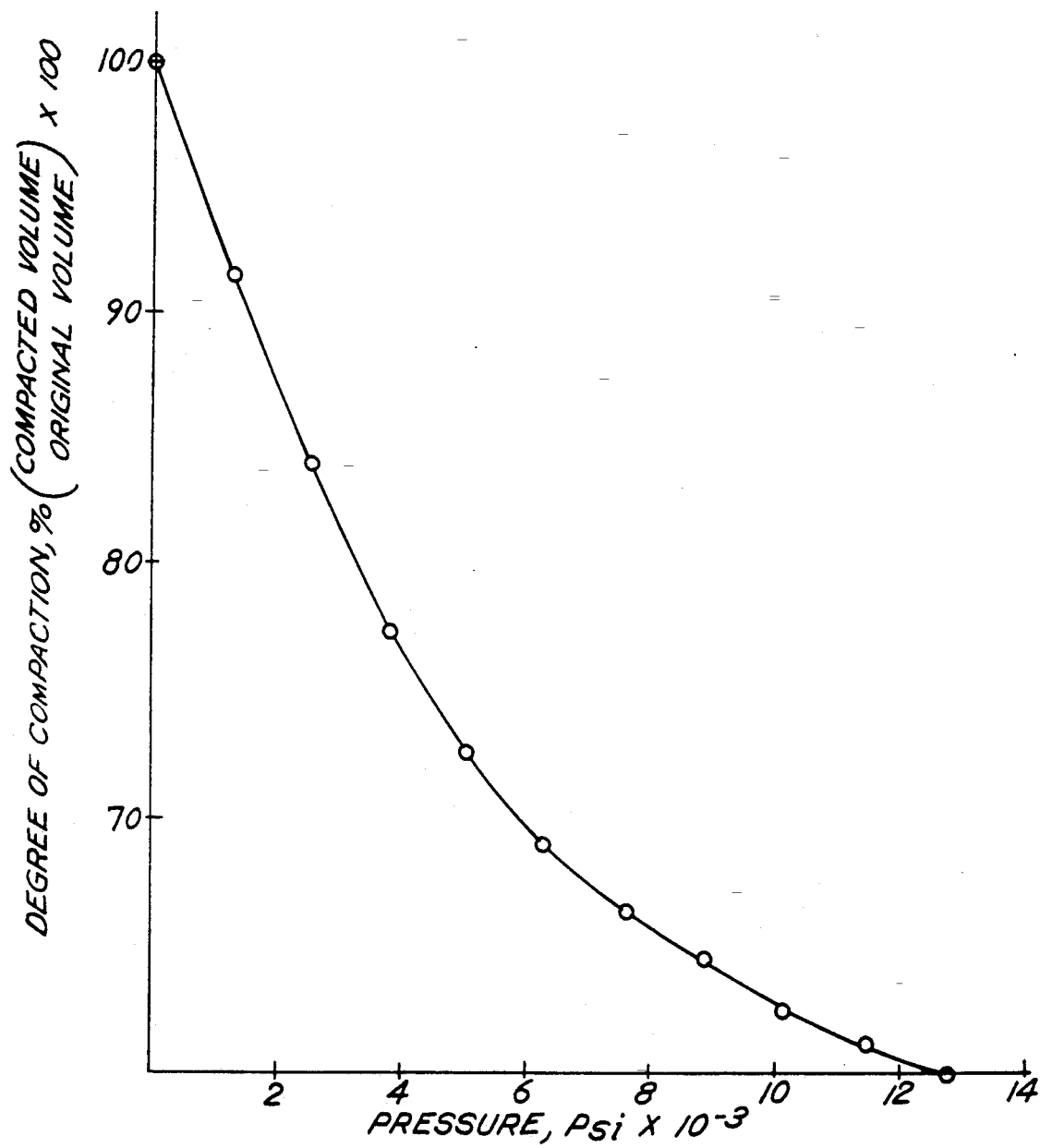
Fig.6 VOLUME OF HSC-9400(30) AS A FUNCTION OF APPLIED PRESSURE

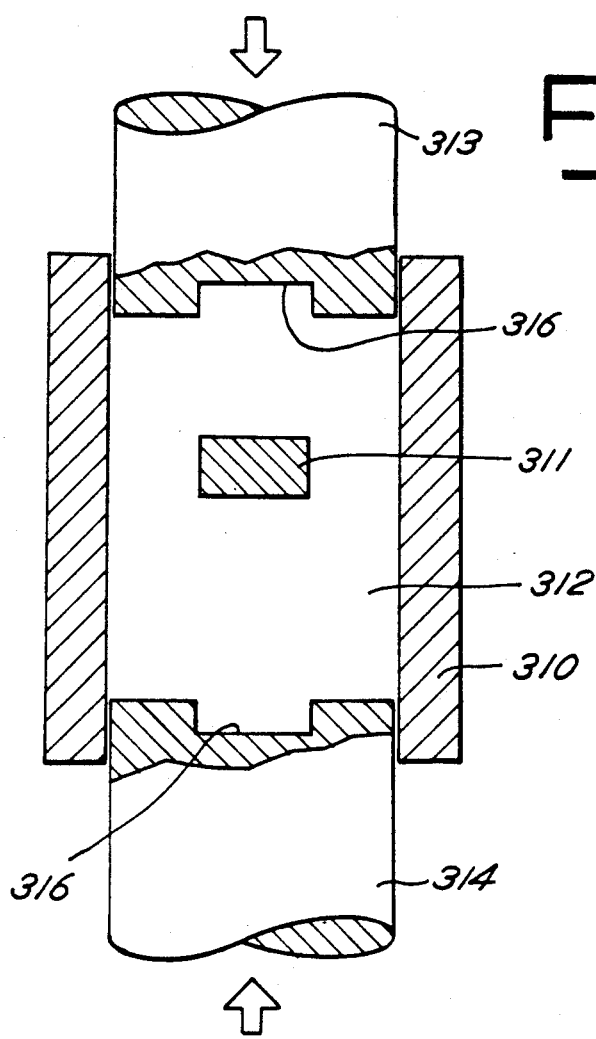
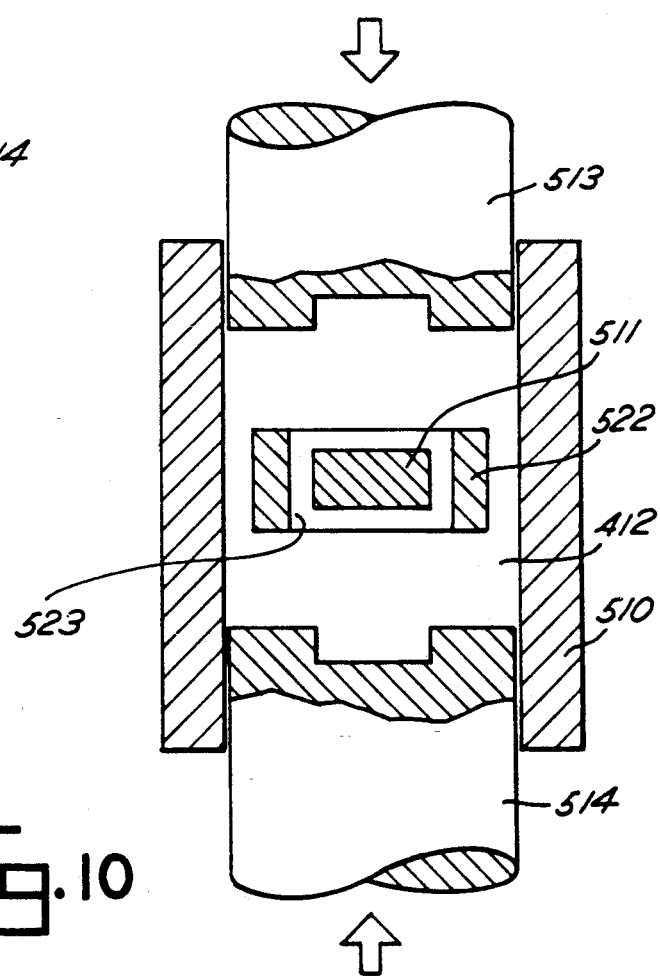

PROCESS AND APPARATUS FOR ELECTROCONSOLIDATION

This application is a continuation-in-part of application Ser. No. 544,046, filed on Dec. 14, 1990, which is a continuation-in-part of application Ser. No. 286,980, filed on Dec. 20, 1988, now abandoned.

BACKGROUND OF THE INVENTION

The present invention is directed generally to apparatus for and improvements in powdered metal consolidation processes, some of which referred to as "electroconsolidation" processes, and more particularly to processes employing specially shaped rams or electrodes and/or other press elements for controlling the pressure and/or electrical flux (current density) within a die chamber to control the rate and uniformity of heating of a workpiece to be consolidated.

Electroconsolidation is one of a class of "pseudo-fluid" or "pseudo-isostatic" processes for consolidating preformed materials into highly densified components. In general, prior art "pseudo-fluid" or "pseudo-isostatic" processes have utilized a bed of solid particles as a pressure transmitting medium. The solid particles which typically comprise the medium for such prior art processes thus serve as "soft-tooling" to enable pressure to be applied to an article in shapes of various complexities that could not simply be pressed between the flat-faced punches of the usual "hot-press" apparatus. One purpose of such "pseudo-fluid" or "pseudo-isostatic" processes is to permit manufacture of near net-shaped components of high density from lower density preformed shapes, to permit production of finished goods with a minimum of post-pressing processing, and to accomplish this result more rapidly and at lower cost than the conventionally established hot isostatic pressing (HIP).

Numerous methods that utilize solid particles as pressure transmitting media have been described in the prior art. Lange and Terwilliger [Lange, F.F. and Terwilliger, G.R., "The Powder Vehicle Hot-Pressing Technique", *Am. Cer. Soc. Bull.*, Vol. 52, No. 7 (July 1973)] discuss in detail the purposes and technical considerations for using a "secondary powder" as a "powder vehicle" for conveying pressure to a heated object (preform) to be densified. Ferguson and co-workers described the "Ceracon process" which utilizes spherical-shaped grains of high elastic modulus as the medium for conveying the consolidation pressure to the preform. [Ferguson, B.; Kuhn, A.; Smith, O.D.; and Hofstatter, F., "Hot Consolidation of Porous Preforms Using Soft Tooling", *Int. Journ. of Powder Met. & Powder Tech.*, Vol. 20, No. 2 (1984)]. A series of background patents regarding the present invention include those of U.S. Pat. No. 4,041,123 to Lange et. al., U.S. Pat. No. 4,539,175 to Lichti et. al., and U.S. Pat. No. 4,640,711 to Lichti et. al. (1987). The Lichti and Hofstatter '175 and '711 patents describe the use of a spherically-shaped product of graphitic or other carbonaceous material as a pressing medium for the consolidation process.

U. S. Pat. No. 4,853,178 to Oslin et. al., and U.S. Pat. No. 4,933,140 to Oslin et. al. pass electrical current through the grain to effect the heating of the grain in the prior art process of the Lichti et. al. '175 and '711 patents. Whereas the Oslin patents teach the electrical heating of the particles of the pressure transmitting medium prior to compacting of the preform (body) into the desired final dense body, the electroconsolidation process employs electrical (electrothermal) heating after the application of the compaction pressure; because of this, the design of the die and ram assemblies is more critical in the electroconsolidation process than in the earlier pseudo-isostatic processes. The design of the ram assemblies as utilizable in the type of electroconsolidation process hereof and other processes is one principal subject of this invention.

As noted, in the method of electroconsolidation, as set forth for example in co-pending application Ser. No. 544,046, filed on Dec. 14, 1990 to Goldberger, the pressure transmitting medium is electrically conductive, and electric current is made to flow through the compacted medium, thereby to cause electrothermal heating to raise the temperature of the preformed work piece to the desired temperature for effective consolidation. Thus, in the electroconsolidation process, the solid particles are used, not only to transmit compaction pressure, but also to serve as an electrical resistor for the conversion of electrical energy into heat.

Despite the greater utility of these prior art processes as compared to yet earlier methods and apparatus, certain improvements have been possible and desirable.

Wherefore, it is a material object of the present invention to provide such improvements and to materially alleviate certain problems associated with the prior art.

SUMMARY OF THE INVENTION

The present invention is directed to improved processes and apparatus for controlling the electrical energy release pattern within a die containing a particulate medium, and to do so for the electroconsolidation of a work piece by controlling the degree of compaction of the pressure transmitting and electrically conductive particulate medium within the various zones of the die chamber.

Some embodiments of the improved processes of the present invention contemplate controlling the degree of compaction by providing rams which generally conform in longitudinal cross-sectional shape to that of the preform. In such preferred embodiments, these rams, if disposed to contact each other, would in preferred embodiments enclose and generally conform to the exterior shape of the preform.

In addition, such shaped rams are also applicable in nonelectroconsolidation processes which utilize a flowable pressing medium, and function therein to transmit compaction forces more uniformly in multi-directional array within the compaction chamber.

In certain preferred embodiments of the improved process hereof, projections are provided on the rams, inter alia, to selectively develop at least one zone of relatively high compaction within the die chamber, which in the electroconsolidation process results in release of the major portion of the electrical energy within the zone having a relatively high degree of compaction.

In alternative preferred embodiments, at least one separate member of a selected shape may be inserted within the die chamber for modifying the electrical resistivity pattern thereof. In some preferred embodiments, this member may comprise a ring member to be inserted within the die chamber to effectuate a selected pattern of electrical resistivity to the die chamber.

The improved process for electroconsolidation of the present invention may be better understood with regard to the following brief description of the drawing, de-

BRIEF DESCRIPTION OF THE DRAWING

FIG. 4 is a schematic representation of a pressure-measuring transducer device, as installed within a die chamber, and with the pressure thereof transmitted to a load cell to measure the pressure exerted along the vertical axis thereof;

FIG. 5 is a graph of applied pressure (PSI) versus load cell pressure (PSI) showing the internal pressure in the vertical and horizontal planes, and showing the measured pressures when the load cell is positioned to measure the horizontal thrust of pressure as a function of the pressure applied to the rams;

FIG. 6 is a graph depicting pressure (PSI), versus the degree of compaction (%), and showing the volume of the medium used [HSC-9400 (30)] as a function of applied pressure;

FIG. 8 is a longitudinal cross-sectional view of a die chamber showing rams with modified functional surfaces to provide essentially constant displacement of the ram surfaces relative to the preform, and which generally conform to the shape of the preform;

FIG. 10 is a longitudinal cross-sectional view of a die chamber showing the disposition of a cylindrical ring member disposed wherein the annular zone surrounding the preform within the consolidation chamber for controlling the degree of compaction is imparted to the preform.

DETAILED DESCRIPTION OF PREFERRED EMBODIMENTS

Figure 1:
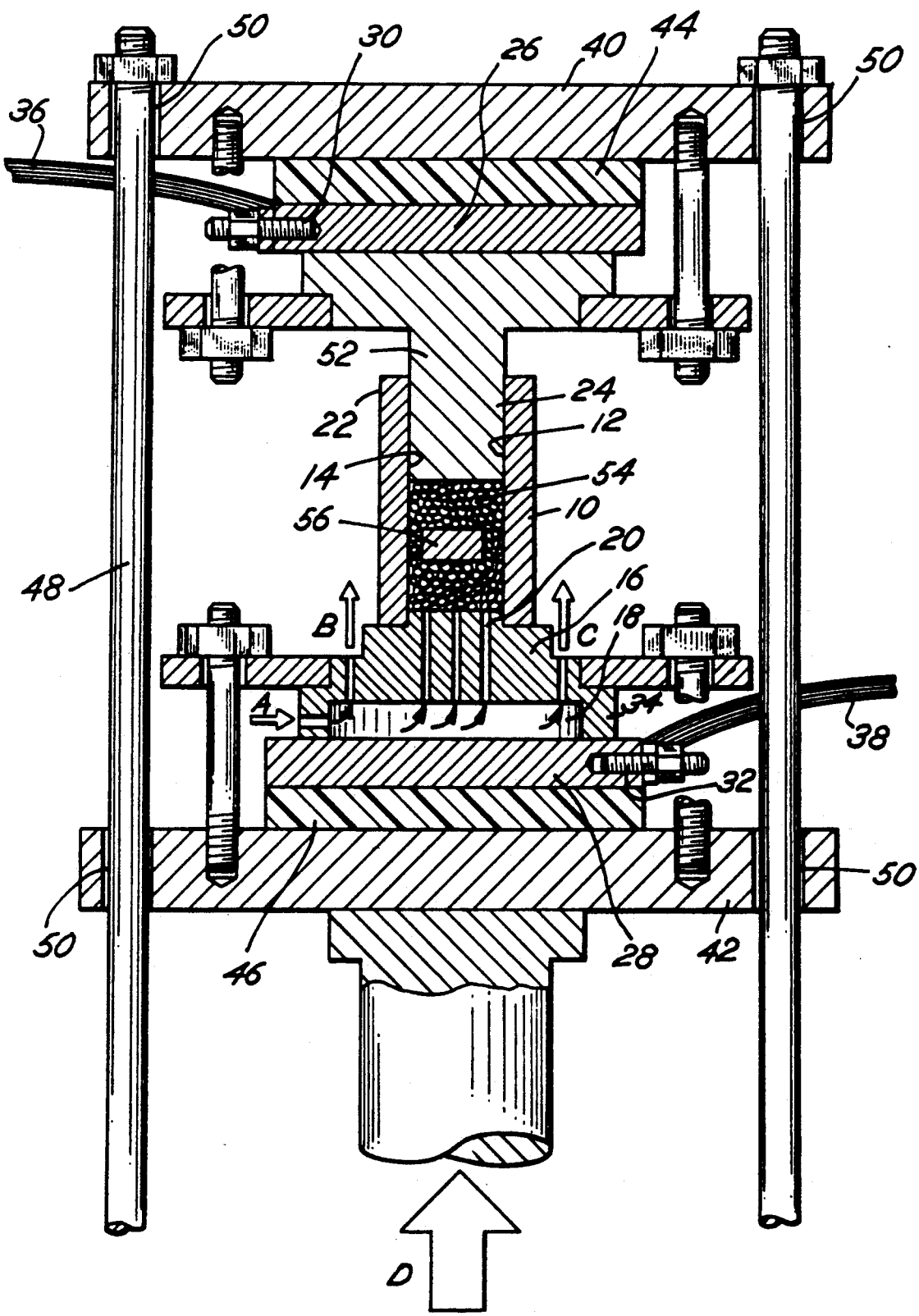
FIG. 1 is a longitudinal cross-sectional view through a die containing an electrically conductive medium and in which a preformed workpiece (hereinafter sometimes referred to as a "preform") is disposed for consolidation thereof.

The electroconsolidation process can be operated using various apparatus, such as that disclosed in Goldberger patent application Ser. No. 544,046, filed on Dec. 14, 1990, for example. Depending on the dimensions of the die chamber, the dimensions and shape of the part to be consolidated, and on the applied compaction pressure used, the heating conditions within various portions of the die chamber may vary. Consequently, significant temperature gradients therein can exist. The finished work-piece can have non-uniform densification resulting in poor quality.

The cause of such potential non-uniform heating within the die chamber can occur based upon the related effects of (a) workpiece geometry, and (b) pressure variations within the die chamber, which (c) then may affect electrical characteristics of the pressure transmitting medium.

In the case of an "ideal" pressure transmitting medium, the medium would be able to flow without internal friction. In this the ideal case, there can be no pressure gradients established within the die chamber, and the compaction is termed "isostatic." Such behavior is essentially achieved when a fluid, either gas or liquid, is used as the pressure transmitting medium, as in the process of cold isostatic pressing (CIP) or hot isostatic pressing (HIP). However, for many industrial processes, the use of fluids to transmit the compaction pressure may not be technically feasible, or is either too complex and/or to expensive to be commercially practical. For cases when very high temperatures are needed to effect the consolidation for example, a temperature of at least 1850° C. is needed for the solid state consolidation of silicon carbide], the use of liquids is often not possible because of their increased volatility and greater reactivity at such high temperatures.

It is possible to use an inert gas as the pressure transmitting medium, as is done in the HIP process, but this requires that the preformed part first be made impermeable to gas flow, and thus it must be clad with some material that is stable and non-reactive at the consolidation temperature. Generally, special metals and super alloys in the form of foil are the materials used for such cladding. These must be vacuum sealed around the preform. Such special handling is complex and expensive. Moreover, the equipment needed to pressurize the gas in a controlled manner and for heating the preform to high temperature during the pressurization cycle is also complex to operate and relatively costly to carry out. For these reasons, the "pseudo-isostatic processes" have been developed which use particulate solids rather than fluids, as the pressure transmitting medium.

However, particulate solids do not behave as "ideal fluids." The degree to which a given particulate solid material will approach the "ideal" state depends on the particle properties of shape, morphology and other characteristics, such as particle strength and lubricity. These factors control the ability of the particles to flow under pressure and to rearrange themselves continually and to fill the void caused by the densification of the preform and thereby to transfer the pressure continuously and uniformly to the object. A particle system that tends to "bridge" or become "locked" with application of pressure will not transfer pressure uniformly, and thus gradients of pressure will exist within the die chamber.

As noted, particulate solids are not ideal fluids, and during the compaction cycle pressure gradients in fact do occur within the die chamber. Depending on the dimensional requirements of the finished part and the properties of the material being consolidated, the pressure gradients might or might not present a problem, for example, in the circumstances of those prior art pseudoisostatic compaction processes which employ a particulate pressure transmitting medium. However, in the special case of the electroconsolidation process, pressure gradients not only influence the dimensional changes that occur during densification of a preformed part, but pressure gradients also affect the pattern of electrical current flow through the pressure transmitting medium and thereby influence the uniformity of heating. It has been observed that, depending on the relative size of the preform and the die chamber and the temperature required, temperature gradients greater than 100° C. per inch can exist. Under these conditions, it is not possible to control effectively the dimensional changes that take place during consolidation, and thus the desired dimension specifications and finished properties cannot be achieved.

As summarized, supra, one advantage it has of the present invention is to control the temperature pattern and temperature gradients that exist within the die chamber when the electroconsolidation process is being carried out. It is a further advantage of certain embodiments of the present invention to reduce temperature gradients in the vicinity of the preform being consolidated to within acceptable limits, such that the deformation due to differential thermal stresses does not exceed the dimensional tolerances specified for the particular part.

A number of process variables, such as the degree and the rate of applied electrical power and the overall dimensions of the electroconsolidation chamber, will influence the rate of temperature increase within the die chamber and the temperature profile patterns that may occur during electroconsolidation. The particular electrical character of the pressure transmitting medium is also a factor that must be considered when specifying the conditions to be used for the manufacture of a given part by the electroconsolidation method. Other process variables include those that influence the pressure at any location within the die chamber, and which can be summarized as follows:

the average applied pressure,
the relative size of the part and the die chamber,
the position of the part relative to the die walls and rams,
the shape of the part, and
the particularized and general shape of the rams.

These and other broadly-defined process variables may be modified by those skilled in the art to achieve idealized performance in particular circumstances.

The "ideal" pressure transmitting medium for electroconsolidation will possess a number of physical properties and/or characteristics. This pressure transmitting medium must, of course, be electrically conductive, but must still have adequate electrical resistivity to serve as a resistive heating element. Such a pressure transmitting medium must also have sufficient mechanical strength to be resiliently compressible to be able to withstand the imposed compaction pressure and be deformed under compressive load without breakage. In addition, the ideal pressure transmitting medium must be free flowing and without internal or sliding friction, such that it will flow as a true fluid to fill all open spaces during the pressurization cycle and thereby transmit pressure uniformly and essentially isostatically. Moreover, the ideal pressure transmitting medium will be inert and non-sticking at the conditions of the electroconsolidation.

In addition, the ideal pressure transmitting medium for the electroconsolidation process should have an electrical resistivity which is independent of the applied pressure.

There is, of course, no particulate solid material that offers all the optimum properties of such a hypothetical ideal medium. For example, no particulate solid is without friction and able to flow like a fluid, and therefore it is not possible to apply a uniaxial compressive force on a column of particulate solids, and thereby to transmit the pressure uniformly in all directions within a compacted bed of the material. Nor is it possible to have a resiliently compressible, electrically conductive material that exhibits electrical resistivity that is independent of pressure. The result of the departures of the physical properties of actual materials from those of the ideal pressure transmitting medium affects the performance of the electroconsolidation process.

Apparatus suitable for use to conduct the present improved electroconsolidation and other consolidation processes is illustrated in the Figures hereof. Referring to FIG. 1 in particular, a partially longitudinal cross-sectional view is set forth and showing a cylindrical vertical sleeve 10. To minimize electrical conduction, a ceramic coating 14 has been applied by painting the inner surface 12 of sleeve 10 with a colloidal suspension containing boron nitride or other high temperature stable non-conducting solid particulate. Sleeve 10 was placed on a machined support 16 having a plenum chamber 18 into which inert gas (Arrow A) was admitted. The inert gas was able to exit the plenum chamber 18 through an array of small holes 20 drilled vertically from the top which allowed the inert gas to flow upward from plenum 18 and into the interior of sleeve 10 and also upward through another array of holes drilled vertically from the top but located outside of the exterior of sleeve 10, such that the inert gas shielded the outside surface 22 of sleeve 10 from direct contact with air; the path of inert gas flow is indicated by Arrows B and C. A vertical piston or ram 24 machined from cylindrical stock to a diameter only slightly smaller than the inside diameter of sleeve 10, and was located for entry into sleeve 10, as shown in FIG. 1. Upper and lower copper plates 26 and 28 respectively containing connected drilled holes to serve as conduits for cooling water were positioned in direct contact with ram 24 and lower support 34, and served as electrical contactors. In turn, these were connected by electric cables 36 and 38 attached to plates 26 and 28 respectively by tap hole connectors 30 and 32 respectively. The cables 36 and 38 were connected to a suitable power source.

The above assembly was held between platens 40 and 42 of a hydraulic press. Non-electrically conducting (insulating) plates 44 and 46 were inserted to prevent electrical contact between the platens 40, 42 and the electrically active copper plates 26 and 28. Before assembly, the electrically conductive pressure transmitting particulate medium 54 was introduced into the interior of sleeve 10. The preform 56 to be consolidated was also introduced into the interior of sleeve 10 and surrounded by the particulate medium 54. A force D was applied uniaxially by activating the hydraulic press and thereby causing movement upward of platen 42 and causing the compaction of the pressure transmitting medium 54. After compaction to a pressure of approximately 4,000 psi, electrical power was applied to cause electrothermal heating of particulate medium 54 and the heating of preform 56, resulting in the densification of the preform 56.

Figure 2:
FIG. 2 is a photomicrograph of the external configuration of graphitic carbon containing silicon carbide infused within the porous structure thereof, which is one example of a pressure transmitting medium utilizable in the process of the present invention.
Figure 3:
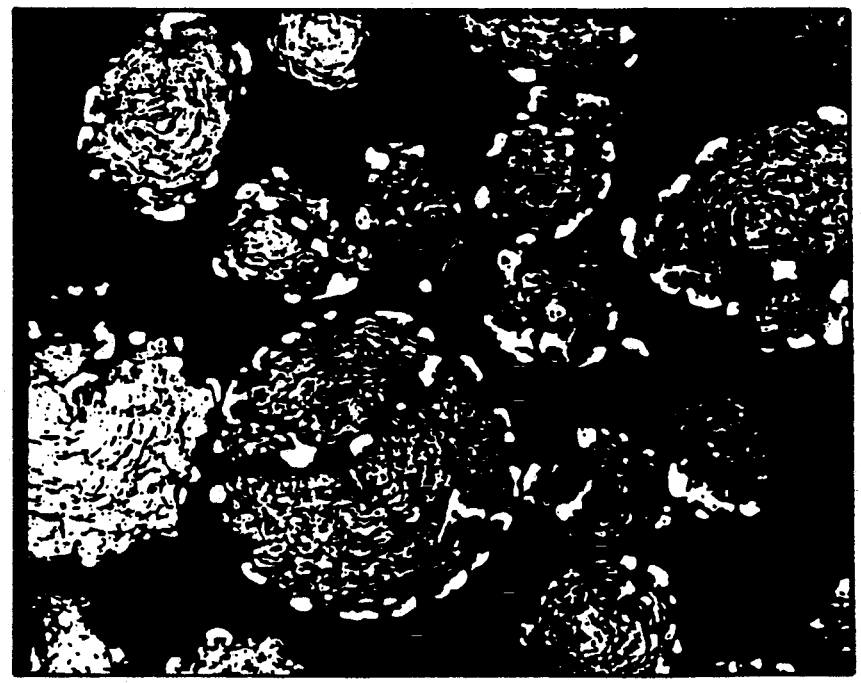
FIG. 3 is a photomicrograph depicting the cross-sectional configuration of graphitic carbon containing silicon carbide infused within the porous structure thereof, which is another example of a pressure transmitting medium utilizable in the process of the present invention.

One pressure transmitting medium for use in the electroconsolidation process is a graphitic carbon containing silicon carbide, both internally and externally as illustrated in the photomicrographs of FIGS. 2 and 3 hereof. One example of an acceptable material has the product trademark designation "HSC-9400" and is produced by the Superior Graphite Co., Chicago, Ill. This HSC-9400 material and other suitable materials may be produced, inter alia, according to methods, structures and apparatus as set forth in U.S. Pat. No. 4,547,430, of like inventor herewith and owned by Superior Graphite Co., Chicago, Ill. This HSC-9400 material flows freely with a relatively low angle of repose; however, it does not transmit pressure uniformly through a die chamber when compressed uniaxially. In other preferred embodiments, a graphitic carbon, which may be spherical or granular depending upon starting materials and processing conditions as described in U.S. Pat. No. 4,160,813, also owned by Superior Graphite Co.) may be utilized. One such example is Superior Graphite's "Desulco", a granular graphitic product. Another example, is Superior Graphite's Grade 5500 Series, which is also of the granular graphite type. Still other carbonaceous and/or graphitic materials, whether non-spherical or other, known in the art may be utilized as a pressure transmitting medium.

As shown in FIG. 4, a pressure measuring transducer device generally 100 is installed within a die chamber 102 and the pressure may be transmitted from a load cell 103 (Omega Load Cell Model LCK-250) by means of flexible electric connection 104 disposed through aperture 106 in steel die wall 108. The pressure is detected by means of pressure transfer pin 110 attached to load cell 103. Steel die walls 108 may be filled with graphite 112 or other preferably carbonaceous or other pressure transmitting medium, and is pressurized within steel die 108 by means of upper and lower rams 114,116. The pressure is measured when the load cell 103 is positioned to measure the pressure exerted along the vertical axis.

The pressure measurements are typically as shown by the data given in FIG. 5 hereof, which relates the measured pressure on the load cell as a function of the average pressure applied to the rams. Also shown in FIG. 5 are the measured pressures when the load cell is positioned to measure the horizontal thrust of pressure as a function of the averaged pressured applied to the rams.

These data illustrate several important phenomena that occur within a bed of compacted particulate solids that substantially influence the performance of the electroconsolidation and other processes. One important fact determined by these experiments as illustrated in FIG. 5 is that the pressure transmitting medium has a tendency to "bridge" or become locked into a fixed position in the axis of the applied force, and thus movement in the direction perpendicular to the applied force is limited. This phenomenon is confirmed from the fact that the measured vertical pressure is substantially higher than the average applied pressure, indicating that a relatively small fraction of the area in the horizontal plane is bearing most of the applied vertical load. As measured horizontal pressure is substantially less than the measured vertical pressure, it is concluded that pressure is not effectively transmitted uniformly in all directions.

These data further indicate that the presence of the workpiece within the die chamber contributes to the "locking" of the medium as it bridges between the ram and the workpiece in the axis of the applied force.

Some of these phenomena are known in general terms to those skilled in the art. However, in any actual material to be used as the pressure transmitting medium in the electroconsolidation process, the electrical resistivity will be affected by the applied pressure. Thus, these phenomena may impose additional design considerations in processes utilizing electrical resistance heating, as compared to other pseudo-isostatic consolidation processes that do not use resistive heating of the compacted medium as the means to achieve the consolidation temperature.

The background for and the features of the improved process for electroconsolidation and the apparatus of the present invention are illustratively further set forth in the following Examples and disclosure:

EXAMPLE I

The characteristic variations of the electrical resistivity pressure transmitting medium suitable for the electroconsolidation process is shown in Table A.

TABLE A

ELECTRICAL RESISTIVITY OF PRESSURE TRANSMITTING MEDIUM MATERIALS AS A FUNCTION OF APPLIED PRESSURE

| Applied Pressure psi | Electrical Resistivity. ohm-cm $\times 10^3$ | | |
|---|---|---|---|
| | 9400[1] | HSC-9400 (15)[2] | HSC-9400 (30)[3] |
| 1348 | 17.47 | 23.09 | 64.78 |
| 2695 | 10.30 | 14.10 | 28.40 |
| 4043 | 7.44 | 10.39 | 18.08 |
| 5390 | 6.19 | 8.54 | 13.34 |
| 6378 | 5.43 | 7.26 | 10.87 |
| 8085 | 4.92 | 6.54 | 9.35 |
| 9433 | 4.43 | 5.96 | 8.42 |
| 10780 | 4.16 | 5.55 | 7.69 |
| 12128 | 4.01 | 5.25 | 7.10 |
| 13475 | 3.77 | 5.01 | 6.68 |

Notes
[1] Superior Graphite Co., Graphitic Carbon Grade 9400 (0 percent silicon carbide)
[2] Superior Graphite Co., Silicon Carbided Graphitic Carbon HSC 9400 (15) (15 percent silicon carbide)
[3] Superior Graphite Co., Silicon Carbided Graphitic Carbon HSC 9400 (30) (30 percent silicon carbide)

These data utilizing one particular consolidation medium demonstrate that the electrical resistivity of these materials decreases sharply with applied pressure in the range of pressures from atmospheric to about 8000 psi, and continues to decrease but at a lesser rate as more pressure is applied and the material becomes more fully compressed. Similar results are observed utilizing other consolidation media. It is therefore apparent that in the case of variation in pressure from one location to another within the die chamber of the electroconsolidation apparatus that the electrical resistance within the die chamber will vary and that in turn the electric current density and heating rates would vary and thus cause temperature variations to occur that would be detrimental in achieving the uniform and controlled conditions necessary in making consolidated products of high quality.

The following exemplary calculations serve to illustrate the effect of differential compaction pressure when a preform is immersed within a pressure transmitting medium and is subjected to a uniaxial consolidation pressure applied by flat faced rams during operation of the electroconsolidation process.

EXAMPLE II

For the case of consolidating a preformed disk of 1-inch diameter and 0.5 inch thickness contained within a bed of a pressure transmitting medium comprising silicon carbided graphitic carbon HSC 9400 (30) which has the pressure-volume relationship shown in FIG. 6, the effect of the presence of the preform on the compaction is indicated below with reference to the example conditions shown in the illustration of FIGS. 7a and 7b. For the purpose of this Example and to simplify the calculations hereof, several assumptions have been made: (1) the pressure is applied uniaxially by double-acting rams that move only in the vertical direction, and the distance moved by the rams is equal; (2) there is no horizontal component of the applied pressure—i.e., all the pressure imposed by the rams on the medium is in the vertical direction, and there is no sidewise movement of the media particles; (3) the pressurization takes place at ambient temperature; and (4) the dimensions of the preform are not changed during movement of the rams.

Figure 7:
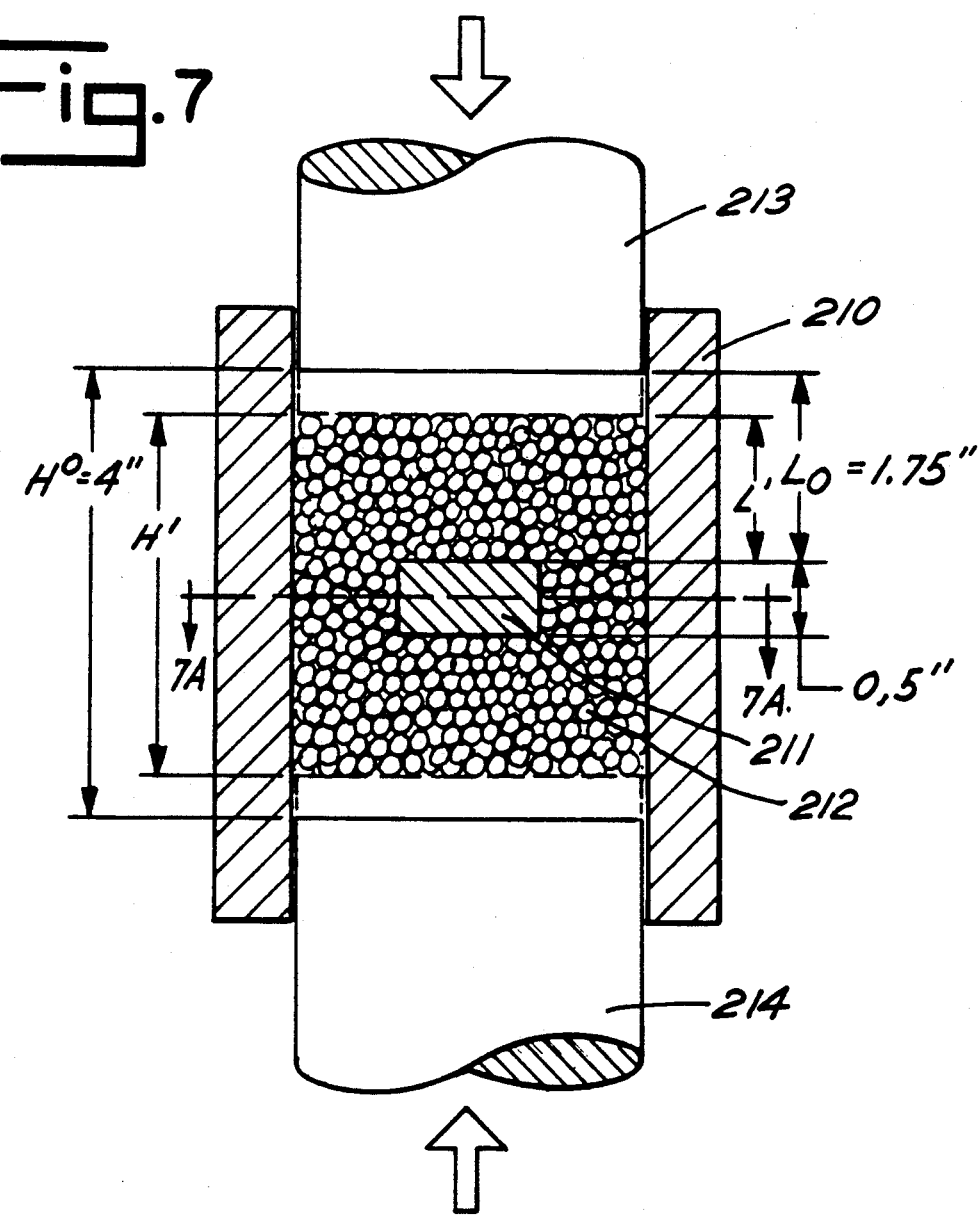
FIG. 7a is a longitudinal cross-sectional view through a portion of an electrical resistance consolidation die showing the preform therein disposed equidistant from the upper surface of the lower ram and the lower surface of the upper ram within the die chamber.
FIG. 7b is a cross-sectional view taken along lines 7a—7a of FIG. 7a and showing the relative sizes of Area A1 (the area above and below the preform) and Area A2 (the angular area between the die wall and preform corresponding to the amount of movement of the rams)
Figure 7A:
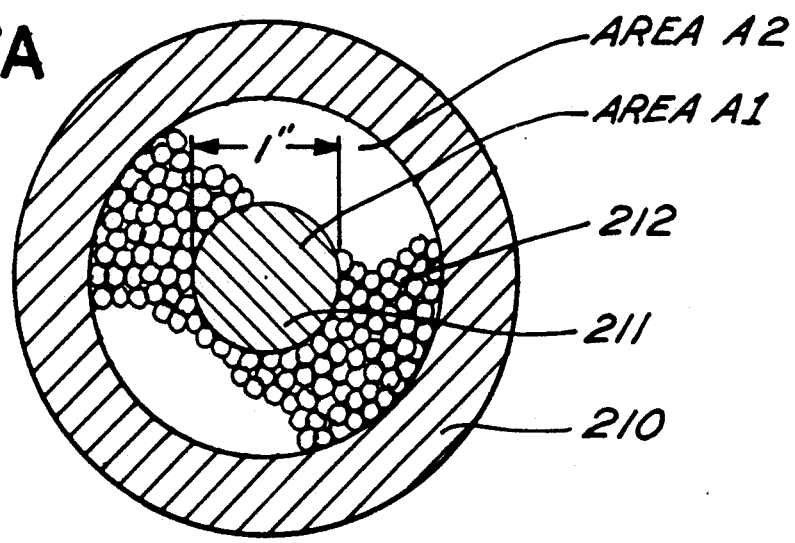

Referring to FIGS. 7a and 7b, in the Example hereof the preform 211, a disc there of 1-inch diameter and 0.5 inch thickness, is positioned within the pressure transmitting medium 212 such that the distance between the upper surface of the preform 111 and the surface of the upper ram 213 is equal to the distance between the lower surface of the preform 211 and the surface of the lower ram 214. The preform 211 is also positioned such that the vertical axis of preform 211 is on the vertical axis of the die chamber 215, and therefore the distance between preform 211 and the die wall 210 is the same in all directions, as shown in the plan view (FIG. 7b). Taking the initial distance between the rams, H°, as equal to 4.00 inches, and assuming that all free space in the die chamber is essentially filled by the preform 111 and the medium 212 at the full packing density of the medium under no load conditions, by referring to the relationship in FIG. 6, one can determine the pressure within the Area A1 above and below preform 211 and the pressure within Area A2 which is the annular area between the die wall and preform 211 corresponding to the amount of movement of the rams 213 and 214.

If in this Example a force is applied to the rams sufficient to compress medium 212 such that the new distance between the rams, H', is 3.5 inches, the compaction of the medium in the annular region is equal to 3.5/4 or equivalent to 87.5 percent of the original bed volume. However, in the area immediately above or below the preform 211, the compaction is equal to the new distance between the preform and the ram (1.50 inches) divided by the original distance (1.75 inches) and therefore the calculated compaction is 1.50/1.75; or, 85.7 percent of the original volume.

It is clear therefore that the medium within the zones above and below the preform will be subjected to a different pressure than the medium within the annular zone because of the difference in the extent of compaction due to the ram movement. Referring again to FIG. 7a and 7b, one also can determine that the pressure in Area A1 will be 2200 psi whereas in Area A2 it will be 2000 psi; and, the electrical resistivity in the two zones will be 43 ohm-cm $\times 10^{-3}$ and 38.5 ohm-cm $\times 10^{-2}$ respectively in areas A1 and A2.

EXAMPLE III

Similar exemplary calculations can be made for increased levels of compaction, and the results thereof are set forth in Table B.

TABLE B

DIFFERENCES IN THE PRESSURE AND RESISTIVITY OF HSC 9400 (30) MEDIUM AS A FUNCTION OF THE DEGREE OF COMPACTION

| Distance H', in. | Compaction, %[1] | | Pressure, psi | | Resistivity, ohm-cm $\times 10^3$ | |
|---|---|---|---|---|---|---|
| | A1 | A2 | A1 | A2 | A1 | A2 |
| 4.0 (H°) | 100 | 100 | 0 | 0 | | |
| 3.50 | 85.7 | 87.5 | 2200 | 2000 | 38.5 | 43.0 |
| 3.00 | 71.4 | 75.0 | 5300 | 4300 | 14.4 | 18.2 |
| 2.75 | 64.3 | 68.8 | 8900 | 6300 | 9.2 | 12.2 |

[1]Compaction calculated as the volume of compacted medium as a percentage of the original uncompacted media.

The electrical resistance can be calculated from the relationship $$R = p \times \frac{L}{A}$$

where R = resistance
P = resistivity
L = length of path; and,
A = area of the path

EXAMPLE IV

For the present Example, the length of the path is considered to be the distance between the face of the upper ram and the upper surface of the pellet, and the areas are A1 and A2. Based thereon, the calculated electrical resistance and power density corresponding to current flow through cross-sections A1 and A2 are given in Table C for various levels of compaction of a conductive pressure transmitting media.

TABLE C

CALCULATED DIFFERENCES IN ELECTRICAL RESISTANCE, CURRENT AND POWER DENSITY IN COMPACTED HSC 9400 (30) MEDIA WITH 5 VOLT APPLIED

| H¹, in. | L | | R. ohms $\times 10^3$ | | Current I. Amps² | | Current Density I/A, Amps/cm² | |
|---|---|---|---|---|---|---|---|---|
| | in. | cm | A1 | A2 | A1 | A2 | A1 | A2 |
| 3.50 | 1.50 | 3.810 | 28.95 | 4.04 | 173 | 1237 | 34.1 | 30.5 |
| 3.00 | 1.25 | 3.175 | 9.02 | 1.43 | 554 | 3496 | 109.3 | 86.2 |
| 2.75 | 1.125 | 2.875 | 5.22 | 0.86 | 958 | 5814 | 189.0 | 143.4 |

It is therefore evident from these calculations that for an equal voltage drop the current density would be substantially higher within the region above the preform than in the surrounding annular zone. Also, the energy dissipation would be correspondingly greater in the projected zone above the preform than in the surrounding annular zone. Moreover, the energy dissipation would be correspondingly greater in the projected zone above the preform. Also, the relative difference in the energy dissipation increases with the degree of compaction within the limits of such Example.

Although the above exemplary calculations have been made with a number of simplifying assumptions which do not correspond precisely to the conditions met in actual practice, experience has demonstrated that very high temperature differences can occur from the inside to the outside of the die chamber and from the center section of a preform to the outer zone of the preform when the electroconsolidation process is conducted in apparatus utilizing flat-faced rams of the type illustrated in FIG. 1.

It has also been determined that such temperature gradients are very dependent on the degree of compaction imposed during the consolidation and upon the level and rate of application of electrical power and increase sharply as the degree of compaction and power levels and power-time loadings are increased. A further factor which increases the tendency for large temperature differences to occur within the die chamber of the electroconsolidation process is that the electrical resistivity of most materials decreases with increasing temperature. Thus, because the current flow becomes concentrated in the zones of greater compaction, these zones increase in temperature more rapidly than surrounding zones and the relative resistance becomes even lower due to the more rapid increase in temperature of the more compacted zone with a continual increase in the relative power dissipation. The result is that any pressure differential will lead to an increasing relative rate of power dissipation within the zones of higher compaction during the entire period of application of electrical power. It has thus been determined that, in order to control the temperature conditions during the electroconsolidation power cycle, it is beneficial to minimize differences in the degree of compaction. By such means a further principal object of the present invention, which is to minimize temperature gradients within the die chamber and especially within the vicinity of the preform during the application of electrical power, may be realized.

In summary, the cause for non-uniform compaction of the pressure transmitting medium between flat-faced rams in an electroconsolidation apparatus of the type shown in FIG. 1 is the influence of the volume of the preform itself on the extent of the compaction that occurs when a closing force is applied to the rams and the rams are moved to apply uniaxial pressure to the pressure transmitting medium. Because pressure transmitting media are not ideal fluids and do not move freely during uniaxial compaction, a "locking" or "bridging" can occur that results in zones of higher and lower electrical resistance, and subsequently temperature gradients develop as electrical current is made to flow through the compacted material. The extent of the nonuniform degree of compaction depends on a number of factors, which include the physical and electrical characteristics of the pressure transmitting medium, the average applied pressure, the rate and extent of the applied electrical power, the dimensions of the preform, the relative position of the preform within the die chamber, and the dimensions of the die chamber.

EXAMPLE V

As illustrated in FIG. 8, in the present invention the shape of the rams 313,314 is changed from that of prior art ram faces, which have a flat surface perpendicular to the axis of the ram movement, to have a ram face surface 316 which has a shape that generally conforms to the shape of the preform 311. Upon application of a compacting force, the displacement of rams 313,314 relative to preform 311 can be made to be essentially constant across the cross-section of the die chamber 310 containing a pressure transmitting medium of the type described herein, and as illustrated in FIG. 8. For ease of illustration, the shape of the preform and that of the rams shown in FIG. 8 are simple geometric shapes; however, more complex shaped preforms may be formed utilizing correspondingly complex shaped ram surfaces to meet the functional objective of maintaining the displacement of the ram surface from the surface of the preform essentially equal across the full surface of the preform when measured in the direction parallel to the axis of the ram movement.

As a general proposition, the design of the rams should conform in general to the shape of the preform, in some embodiments much as the split mold of a casting process, or as the die of an injection molding process conforms to the shape of the part being formed. However, the degree of such shape conformity that may be required in the ram design for the improved electroconsolidation and other processes depends upon many of the design factors already noted, supra, and also upon the specific material being consolidated and the extent to which the part being made must meet a net shaped dimensional specification. Thus, for those cases in which the material may be less sensitive to thermal gradients with regard to induced stress, the shape conformity of the rams to the part may be far less critical. For example, higher temperature gradients can be tolerated to a greater extent in the case of the electroconsolidation of powdered metal preforms than in the case of ceramic materials. One principal reason is that the high thermal conductivity of metals relieves the thermal stresses imposed on the part during the densification process. Thus, the ram design for powdered metal consolidation may be less restrictive than for the case of ceramic consolidation, other factors being essentially the same.

EXAMPLE VI

Figure 9:
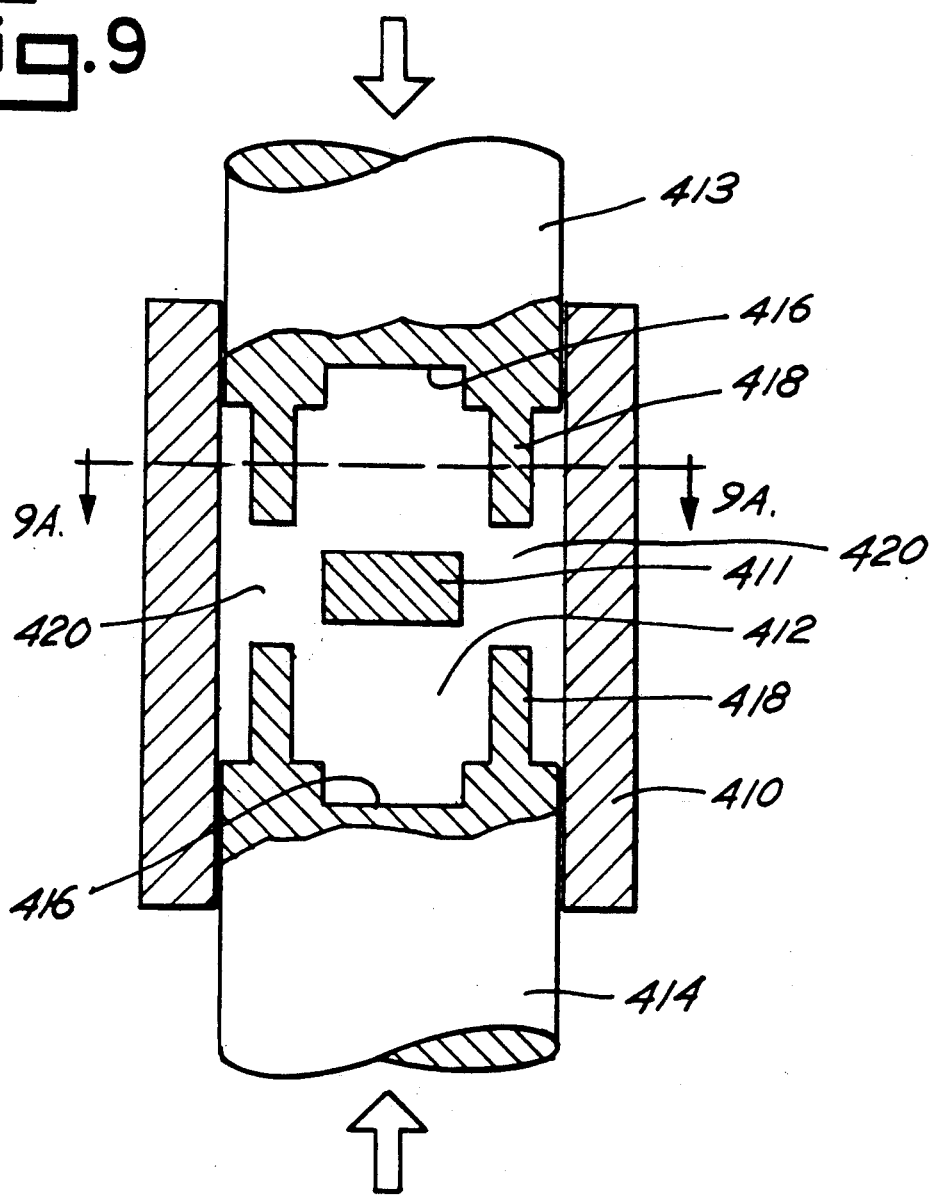
FIG. 9a is a transverse cross-sectional view of a compaction die showing ram surfaces incorporating cylindrical projections which maintain a uniform displacement of the rams relative to the preform, and which function, inter alia, to control more efficiently the pattern of energy release within the die chamber.
FIG. 9b is a transverse cross-sectional view taken along lines 9a—9a of FIG. 9a showing a transverse cross-sectional view of the cylindrical projections disposed on the ram functional surface.
Figure 9A:
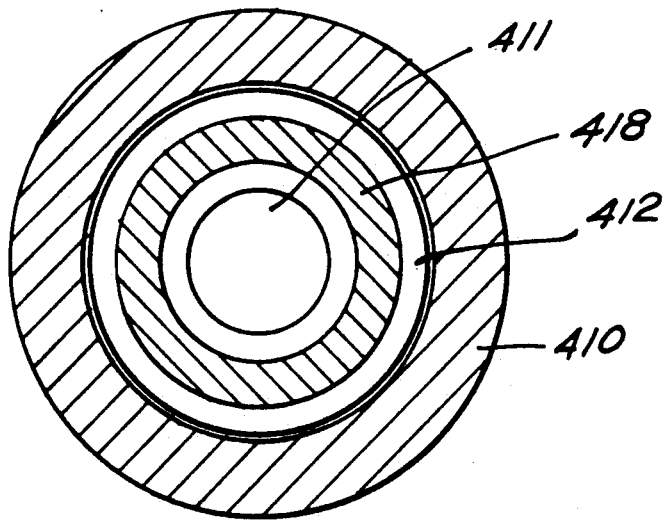

As shown in FIG. 9, it is a general principle of the present invention that the shape of the rams 413,414 in the electroconsolidation method should in certain preferred embodiments conform in some varying degree to the general or specific shape of the preform 411 and thereby maintain a substantially uniform displacement of rams 413,414 relative to preform 411, and thus a substantially uniform degree of compaction in the vicinity of the preform 411. The rams 413,414 may also have ram faces 416,416 which are shaped in a manner to better control the pattern of energy release within die chamber 410. For example, in many cases, it is desirable to moderate the energy release in the vicinity of preform 411 by directing the major part of the electrical current flow to a portion of the annular region around the preform. One means to do this is by incorporating into the design of ram faces 416,416 respective cylindrical projections 418,418, as illustrated in FIG. 9.

Because of cylindrical projections 418,418 incorporated into the design of upper and lower rams 413,414, the compaction of medium 412 is greatest in the annular zone 420 between projections 418,418. For the reasons detailed earlier, the highest current density will occur in this more compacted zone 420, and therefore the highest energy release will be directed to the zone surrounding the preform 411 rather than in the immediate vicinity of the preform 411. Thus, by appropriate design and shape of ram faces 416,416 used in the electroconsolidation process, the energy release pattern can be adjusted to provide a desired heating and temperature profile for appropriate control of the electroconsolidation process.

EXAMPLE VII

As shown in FIG. 10, a related concept that can be implemented for control of the applied electrothermal power release within the die 510 involves the use of a separate member 522 inserted within the die at the time preform 511 is inserted within medium 512. In the case illustrated by FIG. 10, a cylindrical ring member 522 is inserted, as one preferred example, into the annular zone 523 surrounding the preform 511. Generally, the material used for ring member 522 should be electrically conductive and have a low electrical resistivity. Graphite would be one example of a relatively low cost material that could be used for the stated purpose, although other materials of similar properties hereof are contemplated, including but not limited to various modified carbonaceous materials. Electrical conductivity, however, is not a requirement for such cylindrical ring member 522 when it is desired only to develop variable degrees of compaction of the pressure transmitting media.

Of course, more than one such inserted member 522 might also be used, and the shape of the inserted pieces could be complex to conform to the shape of the part as illustrated in FIG. 10.

The application of the principles of this invention may incorporate numerous designs of the rams and other members inserted within the die chamber to control the pattern of compaction and the electrical resistance of the pressure transmitting media. Upon review the present Specification, such modifications will be apparent to those skilled in the act and are to be considered to be within the scope of this invention.

What is claimed is:

1. In the method of consolidating a solid-containing and consolidatable pre-formed workpiece, said method including the steps of:
   providing a bed comprising a bed material of electrically conductive, flowable particles within a contained zone;
   positioning the preformed workpiece in the bed;
   compacting the bed material with pressure at least sufficiently to provide for suitable electrical contact of such bed material; and
   applying electrical energy to said electrically conductive, flowable particles within the bed containing the workpiece sufficient to heat the bed to the consolidation temperature for the workpiece, and whereby said workpiece is consolidated;
   the improvement comprising controlling the electrical energy release pattern within said bed by controlling the degree of compaction of the pressure transmitting and electrically conductive particulate medium within selected zones of the bed.

2. The method of claim 1 wherein said bed comprises a die chamber having at least one movable compression ram for directing compressive force to said preform.

3. The method of claim 2 wherein the degree of compaction is controlled by providing a pair of opposed compression rams having surface contours which generally conform to the surface contours of the preform.

4. The method of claim 3 in which the surface contours of the rams are made to conform generally to the surface contours of the preform, such that the rams if made to contact each other would generally enclose and conform to the exterior shape of the preform.

5. The method of claim 3 in which projections are provided on the rams to selectively develop at least one zone of increased degree of compaction in said die chamber, and thereby to cause a selected portion of the energy released within the die chamber to be released within said zone having an increased degree of compaction.

6. The method of claim 1 in which at least one member of a selected shape is inserted within the die chamber for modifying the electrical resistivity pattern thereof.

7. The method of claim 6 wherein said member of selected shape comprises a ring member, and wherein said ring member is disposed within the die chamber to effectuate a selected pattern of electrical resistivity to said die chamber.

8. The method of claim 7 in which said ring member comprises electrically conductive means.

9. The method of claim 5 wherein said selected portion of energy released is the majority thereof.

10. In a consolidation chamber for consolidating a workpiece preformed from a solid containing material capable of consolidation, said consolidation chamber having a longitudinal dimension, said chamber containing a bed of flowable consolidation particles heated at least to the consolidation temperature of the workpiece, said bed containing therein said workpiece, said chamber further including at least one compression ram movable within said bed in said longitudinal direction toward said workpiece to exert force through said bed of heated flowable consolidation particles for consolidation of said workpiece, the improvement comprising:
   a pair of opposed compression rams having surface contours which generally conform to at least the opposed respective surface contours of the preform and at least a portion of the respective lateral surface contours of the preform which adjoin the respective opposed surface contours of the preform.

11. The improvement of claim 10, wherein the surface contours of the compression rams are made to conform generally to the surface contours of the preform, such that the compression rams if made to contact each other would generally enclose and conform to the exterior shape of the preform.

12. The improvement of claim 10, wherein projections are provided on the compression rams to selectively develop at least one zone of increased degree of compaction in said die chamber, and thereby to cause a selected portion of the energy released within the die chamber to be released within said zone having an increased degree of compaction.

13. The improvement of claim 10, further comprising at least one member of a selected shape disposed within the die chamber for modifying the electrical resistivity pattern thereof.

14. The improvement of claim 10, wherein said member of selected shape comprises a ring member, said ring member disposed within the die chamber to effectuate a selected pattern of electrical resistivity to said die chamber.

15. The improvement of claim 10, wherein said ring member comprises electrically conductive means.

16. The improvement of claim 12, wherein said selected portion of energy released within said die chamber is the majority thereof.

* * * * *